Figure 1:
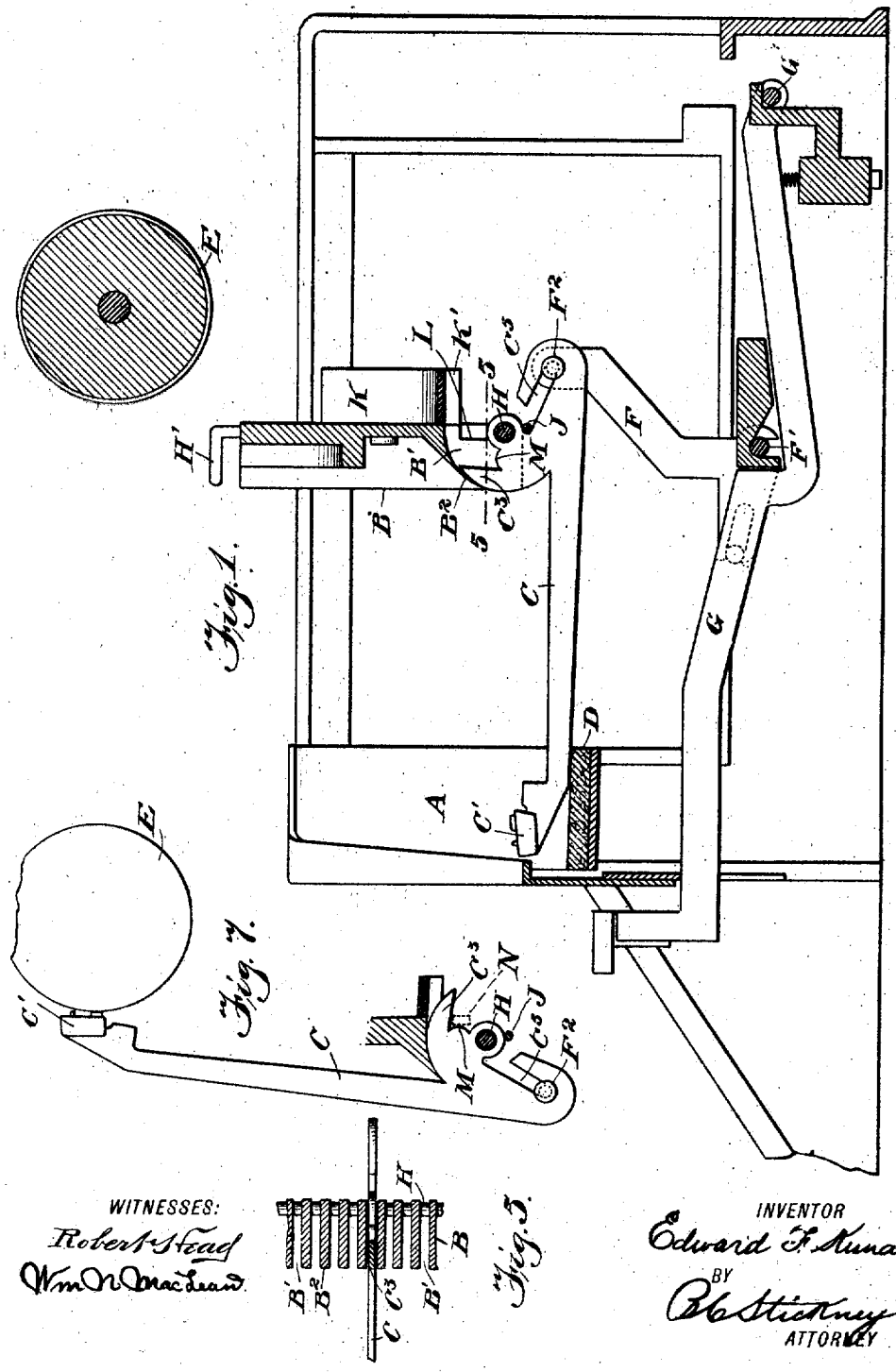

No. 12,252. REISSUED AUG. 2, 1904.

E. F. KUNATH.

TYPE BAR CONSTRUCTION FOR TYPE WRITERS OR THE LIKE.

APPLICATION FILED JULY 2, 1904.

2 SHEETS—SHEET 1.

WITNESSES:

Robert Stead

Wm N MacLean

INVENTOR

Edward F. Kunath

BY

R. C. Stickney

ATTORNEY

No. 12,252. REISSUED AUG. 2, 1904.

E. F. KUNATH.

TYPE BAR CONSTRUCTION FOR TYPE WRITERS OR THE LIKE.

APPLICATION FILED JULY 2, 1904.

2 SHEETS—SHEET 2

WITNESSES:

Robert Head

Wm. A. MacLean

INVENTOR

Edward F. Kunath

BY

R. E. Stickney

ATTORNEY

No. 12,252. Reissued August 2, 1904.

UNITED STATES PATENT OFFICE.

EDWARD F. KUNATH, OF JERSEY CITY, NEW JERSEY, ASSIGNOR TO THE UNDERWOOD TYPEWRITER COMPANY, OF NEW YORK, N. Y., A CORPORATION OF NEW JERSEY.

TYPE-BAR CONSTRUCTION FOR TYPE-WRITERS OR THE LIKE.

SPECIFICATION forming part of Reissued Letters Patent No. 12,252, dated August 2, 1904.

Original No. 752,077, dated February 16, 1904. Application for reissue filed July 2, 1904. Serial No. 215,185.

*To all whom it may concern:*

Be it known that I, EDWARD F. KUNATH, a citizen of the United States, and a resident of Jersey City, county of Hudson, and State of New Jersey, have invented certain new and useful Improvements in Type-Bar Constructions for Type-Writers or the Like, of which the following is a specification.

My invention relates to a construction of type-bars and to means for supporting, guiding, and protecting type-bars.

It has for its objects to facilitate the removal of one or more type-bars from a type-writing machine without disturbing the other type-bars, to so guide the type-bars that they will be braced against lateral motion, especially when in printing position, and to prevent the entrance of dirt or other foreign matter to the pivots or guides of the type-bars, so as to reduce to a minimum the possibility of the type-bars becoming clogged.

In front-strike writing-machines the type-bars are pivoted at their rear ends and strike rearwardly against the platen. The pivots of the type-bars are directly beneath the front side of the platen. The segment in which the type-bars are pivoted stands vertically just beneath the platen, so that when erasures are made upon the paper on the platen the lint and grit fall down behind the segment and are liable to gather in the type-bar slots and interfere with the action of the type-bars. This difficulty is overcome by my invention.

My invention will now be described in its application to a front-strike type-writing machine of the well-known Underwood type; but I desire it to be understood that the invention may be applied to other machines, and, further, that the particular construction shown in the drawings is but a typical example of my invention.

Figure 2:
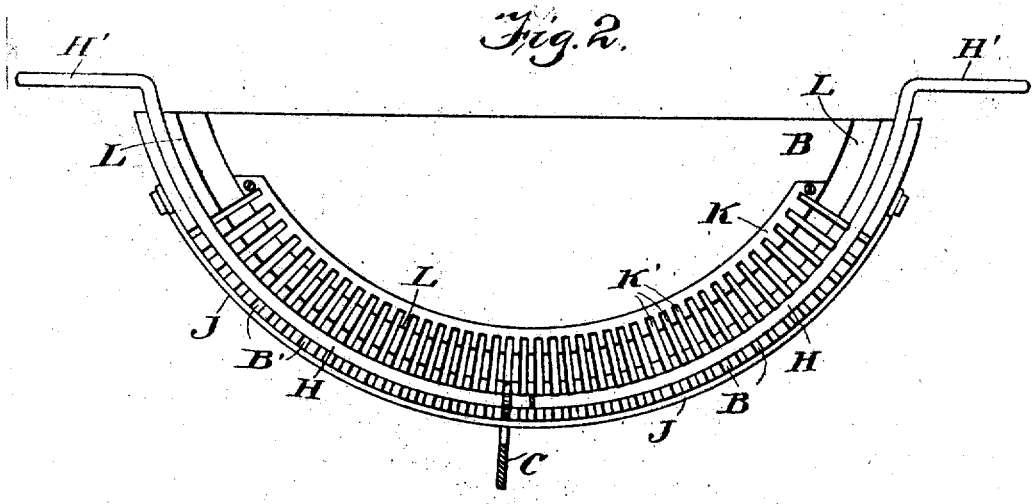
Figure 3:
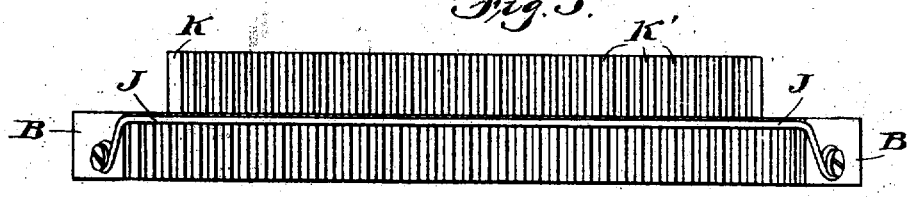
Figure 4:
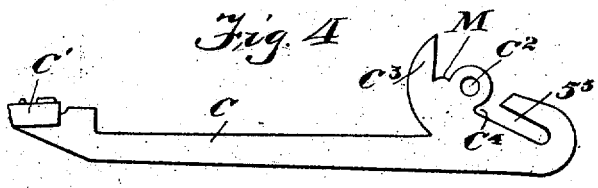
Figure 6:
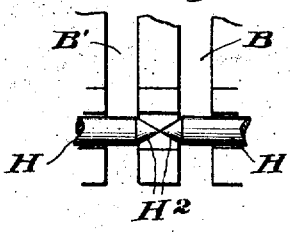

Figure 1 is a sectional elevation of a portion of a type-writer provided with my improvements. Fig. 2 is a rear view of the type-bar support with one of the type-bars in section. Fig. 3 is a bottom view of the type-bar support or segment. Fig. 4 is a side elevation of one of the type-bars. Fig. 5 is a section on line 5 5 of Fig. 1. Fig. 6 is an enlarged detail view of the central portion of Fig. 2 with an additional improvement. Fig. 7 shows a type-bar in printing position.

A indicates the frame of the machine, carrying a segment B, on which the type-bars C are pivotally supported, the type-bars normally resting against the cushion D and being adapted to be thrown up against the platen E by means of elbow-levers F, fulcrumed at F′, and operated by means of key-levers G, fulcrumed at G′.

My present invention has reference to certain features of the segment B and of the type-bars C, together with means for holding the type-bars on the segment, while the other parts of the machine may be of any approved construction.

Each type-bar is provided between the type C′ and the aperture $C^2$, which serves to receive the pivot rod or wire H, with a toe $C^3$, whose exterior or forward edge is curved concentrically with the type-bar pivot H. The type-bars work in radial slots B′ of the segment B. Upon its front side the segment is curved or shaped to coincide with the curved front edges of the toes $C^3$, or, in other words, the portions of the segment located between the slots B′ are so curved as to lie flush with the curved toes of the type-bars whether the type-bars be in the position of rest or in printing position. It will therefore be understood that the toes $C^3$ and the intermediate portions $B^2$ of the segment taken together form a practically continuous curved surface the shape of which does not vary as the type-bars move to and from the printing position, owing to the fact that the type-bar axis is the center of the curvatures of both the type-bar toes and the intermediate segment portions. I thus avoid the formation of recesses or shoulders in which dirt or other foreign matter might lodge, and I efficiently protect the type-bar pivots against the entrance of foreign matter from the front and prevent the type-bars from becoming clogged from this source. At the same time the toes $C^3$, and particularly the free ends thereof working in the slots B′ as the type-bars are operated, act as cleaners or scrapers to remove any foreign material which might get into the slots. Preferably the top side or wall of each slot is curved concentrically with the type-bar pivot and so that it will just be cleared by the toe $C^3$, the tip of the toe standing normally just beneath or within the top of the slot, as at Fig. 1, and barring the ingress of grit.

The rod or wire H which pivotally supports the type-bars C is preferably formed in two sections, as shown in Fig. 2, each of which may be provided with a handle H′ to enable it to be pulled out or pushed in independently of the other section. Thus the type-bars may be released from their pivots and withdrawn whenever desired. It is of advantage, though, that the type-bars should not drop out of their normal positions when they are released by withdrawal of the pivot-wire, and I have therefore provided an additional support which keeps the type-bars in normal position even when the pivot-rod is withdrawn. This auxiliary support consists of a wire J or its equivalent, which wire is secured to the segment and extends below the pivot H to engage a shoulder or notch $C^4$ of each type-bar. Preferably this notch $C^4$ forms parts of an open slot $C^5$, which is also adapted to receive the pin $F^2$ of the elbow-lever F, which swings the type-bar on its pivot. It will be understood by reference to Fig. 1 that even if the pivot H is removed the support J will prevent the type-bars from dropping from their normal positions, and the type-bars can then be removed only by a forward pull followed by a downward movement of the rear end of the type-bar, which movements are not liable to take place accidentally.

In order that the pivots H may be readily inserted, I prefer to construct them as illustrated in detail in Fig. 6, where the inner end $H^2$ of each pivot is shown pointed. This pointed end will act as a wedge and will readily enter the pivot-opening $C^2$ of the type-bar, even if this opening does not perfectly aline with the openings of the adjacent shoulder portions $B^2$ of the segments.

The segment B stands vertically below and just forward of the platen E, and in consequence the scrapings or grit from the paper on the platen due to erasures being made fall down back of the segment and work into the segment-slots B′ from the rear and clog the type-bars. These slots, it will be seen, are cut in the lower or outer edge of the segment B and extend through said segment from front to rear. The grit is kept from entering the slots at the front side by means of the provision already described, and in order to prevent the grit from entering the slots at the rear side, as well as to protect the rear portions of the type-bars and their connections against dust and foreign matter that may drop from the platen, I provide at the rear of the segment and immediately above the slots B′ a segmental cover-plate K, (separate or integral,) which projects rearwardly from the segment B and effectually shields the parts that are liable to become clogged. As seen best at Fig. 2, a segmental recess L is cut in the rear side of the segment B, within which works the usual curved universal bar of the Underwood machine, whereby at the actuation of the type-bars the carriage is fed, &c., the type-bars being provided with tappets M to engage and operate the universal bar. The position of the latter is indicated diagrammatically at N, Fig. 7, this figure showing the positions of the parts when the type is printing. Heretofore the grit falling behind the segment has been caught and worked into the type-bar slots by the movements of the universal bar, which of course operates at each stroke of every type-bar; but by means of the shield K this trouble is entirely avoided.

I prefer to provide the member K with notches K′ on its under surface, as shown best at Fig. 3, these notches K′ alining with the slots B′ of the segment, so that the walls of the notches will form a continuation of the guide which is afforded to the toes $C^3$ of the type-bars by the walls of the slots B′. Thus I secure not only a grit-proof construction, but also a very steady motion of the type-bars, which are well braced against lateral vibration or distortion. The type-bars, as will be seen by reference to Fig. 7, are held rigidly against twisting when at the printing-point, so that an effective blow is delivered upon the platen. This is due principally to the provision of the toe $C^3$, which is constantly in engagement with the guiding-surfaces of the segment and the member K. Since said toe extends above the universal bar, Fig. 7, it does not interfere therewith. The provision of the wire or equivalent support J is of great convenience when it is desired to remove only one or two type-bars, since the other type-bars need not be disturbed.

Having thus described my invention, I claim—

1. In a front-strike writing-machine, the combination with a platen, of a system of rearwardly-striking type-bars pivoted at their rear ends, and a segment having in its lower edge a series of slots in which the type-bars work, said slots extending through the segment from front to rear, and a cover projecting from the rear side of the segment immediately above said slots and directly beneath the front side of the platen, to prevent the lint or grit produced by making erasures on the platen from dropping into or entering said slots at the rear.

2. In a front-strike writing-machine, the combination with a platen, of a system of rearwardly-striking type-bars pivoted at their rear ends, of a segment having in its lower edge a series of slots in which the type-bars work, said slots extending through the segment from front to rear, and the slotted portion of said segment being also grooved or cut away upon its rear side to form a recess for receiving the usual segmental universal bar, and a cover projected from the rear side of the segment immediately above said slots and said recess and directly beneath the front side of the platen, to prevent lint or grit from gathering and being worked into the slots by the movements of the universal bar.

3. In a type-writer or like machine, a support, type-bars pivotally mounted thereon, the said support being provided with slots in which the type-bars move and with ledges between the said slots, the outer surfaces of said ledges being curved with the pivot as a center, and the type-bars being provided with toes similarly curved and arranged to lie flush with the outer surfaces of the said ledges.

4. In a type-writer or like machine, type-bars, a support on which said type-bars are pivotally mounted, said support being provided with slots in which the type-bars move and being also provided with an extension projecting from the side of the pivot opposite to that on which said slots are arranged, and the type-bars being provided with toes arranged to work in said slots and below said extension.

5. In a type-writer or like machine, type-bars, a support to which said type-bars are pivoted, said support being provided with slots on one side of the pivot and with an extension on the other side of the pivot, said extension being notched in line with the said slots, and the type-bars having toes arranged to move in said slots and notches.

6. In a type-writer or like machine, type-bars, a support having radial slots in which said type-bars are pivoted, a removable pivot for connecting the type-bars with said support, and an auxiliary support arranged across the lower ends of said slots for holding the type-bars in their normal position even when the pivot is removed.

7. In a type-writer or like machine, a support, a type-bar pivoted to the support, said type-bar being provided with a laterally-open slot, and an auxiliary support extending into said slot for holding the type-bar when the pivot is removed.

8. In a type-writer or like machine, a support provided with slots and with ledges or walls between them, the said ledges being provided with a guideway, a pivot arranged to lie in said guideway, and type-bars adapted to be received in the slots of the support and to swing on said pivot, the end of the pivot being pointed so that it will readily enter the openings of the type-bars and bring them to their proper position, in combination with an auxiliary support adapted to retain the type-bars when the pivot is removed.

9. In a front-strike writing-machine, the combination with a platen, of a system of rearwardly-striking type-bars below the platen and pivoted at their rear ends, a segment having in its lower edge a series of slots in which the type-bars work, said slots extending through the segment from front to rear, and provision being made to prevent entrance of grit from the front side of the segment into the slots, and a cover projecting from the rear side of the segment immediately above said slots and directly beneath the front side of the platen, to prevent the grit from access to the rear sides of the slots.

EDWARD F. KUNATH.

Witnesses:
B. C. STICKNEY,
WM. N. MACLEAN.